(12) United States Patent
Logie et al.

(10) Patent No.: US 7,506,240 B2
(45) Date of Patent: Mar. 17, 2009

(54) METHOD AND APPARATUS FOR IMAGE PROCESSING

(75) Inventors: James Logie, Woking (GB); Mark Wolforth, Kingston (CA)

(73) Assignee: Filmlight Limited, London (GB)

( * ) Notice: Subject to any disclaimer, the term of this patent is extended or adjusted under 35 U.S.C. 154(b) by 326 days.

(21) Appl. No.: 11/174,310

(22) Filed: Jul. 1, 2005

(65) Prior Publication Data
US 2006/0012540 A1    Jan. 19, 2006

(51) Int. Cl.
*G06F 11/00* (2006.01)

(52) U.S. Cl. ...................................... 714/798

(58) Field of Classification Search .................. 714/798, 714/700, 707, 699, 774, 744, 789, 775; 345/10, 345/204, 530; 348/572, 441, 488; 702/67, 702/75
See application file for complete search history.

(56) References Cited

U.S. PATENT DOCUMENTS

| | | | |
|---|---|---|---|
| 5,808,588 A * | 9/1998 | Lin | 345/6 |
| 6,628,276 B1 * | 9/2003 | Elliott | 345/213 |
| 6,826,247 B1 * | 11/2004 | Elliott et al. | 375/376 |
| 6,919,899 B2 * | 7/2005 | Shiuan et al. | 345/530 |
| 7,111,178 B2 * | 9/2006 | Rusu et al. | 713/300 |
| 7,206,496 B2 * | 4/2007 | Morohoshi et al. | 386/68 |
| 7,257,499 B2 * | 8/2007 | Maier | 702/67 |
| 2004/0255170 A1 * | 12/2004 | Yang et al. | 713/300 |
| 2006/0256119 A1 * | 11/2006 | Xiu et al. | 345/520 |
| 2006/0274194 A1 * | 12/2006 | Ouyang et al. | 348/441 |
| 2006/0274207 A1 * | 12/2006 | Hayden et al. | 348/572 |
| 2007/0094549 A1 * | 4/2007 | Nakamura et al. | 714/700 |

FOREIGN PATENT DOCUMENTS

| | | |
|---|---|---|
| EP | 0 497 377 A2 | 5/1992 |
| FR | 2 840 701 | 12/2003 |

* cited by examiner

*Primary Examiner*—Phung M Chung
(74) *Attorney, Agent, or Firm*—Robert C. Klinger

(57) ABSTRACT

The present application relates to a method of at least substantially synchronizing data output from at least first and second graphics cards (1, 2). A synchronization difference between the first graphics card (1) and the second graphics card (2) is determined and a correction signal (41) generated based on the synchronization difference. The correction signal (41) is supplied to the second graphics card and the operating frequency of the second graphics card (2) is adjusted in response to the correction signal (41). The application also relates to a system (100) for processing images.

59 Claims, 13 Drawing Sheets

METHOD AND APPARATUS FOR IMAGE PROCESSING

CROSS REFERENCE TO RELATED APPLICATIONS

This application claims priority from UK patent application number 0414897.9 filed on 2 Jul. 2004 and UK patent application number 0507606.2 filed on 15 Apr. 2005. The entire disclosure of these documents is incorporated herein by reference.

BACKGROUND OF THE INVENTION

The present application relates to a method and apparatus for processing data. In particular, the present application relates to a method and apparatus for processing images.

The Film Industry, almost since its inception over 100 years ago, has produced films in almost the same way. This involves substantial photo-chemical work. However, recently there have been advances in the 'Digital Film Lab'. In this mode, it is often desirable to digitise all of the 'Camera Original' material, and edit, grade, and add effects in the digital domain. When a final version is agreed on, it is then usual to 'write' this material back onto a (new) film. This technique is often referred to as 'Digital Intermediate', or 'DI'.

To perform techniques of the above type at a resolution that looks like the conventional film, it is necessary to work at resolutions of typically 2048 pixels by 1556 lines per frame. Cinematographic Film requires 24 frames per second to maintain fidelity in motion. Resolutions of 3000×2200 or even 4000×3000 are not uncommon.

One of the many applications that is required to be performed on the data is referred to as 'grading'. This involves altering the 'look' of the material. This in turn consists of many adjustments to be made to the data. One such adjustment is altering the overall 'lightness' or 'darkness' of the material. Another consists of altering the colour reproduction. This may be an overall colour reproduction change, for example making the overall scene 'redder' or 'bluer, or it may be only for a certain range of colours.

To be able to handle files of the image data, whose total capacity can be in the Terabyte range, and to be able to process film frames in 'real time' (i.e. at 24 frames per second) it is generally necessary to utilise powerful computers with substantial amounts of disc space. Such computers are necessarily expensive. Alternatives exist, typically on lower end PC style computers, with processing of frames being in 'non-real time'. However users report frustrations at not being able to see the processed image in real time.

It is desirable to utilise industry standard computer components wherever possible. Currently available personal computer graphics cards offer substantial processing power, and yet because they are sold worldwide in quantities of many hundreds of thousands, are relatively cheap. However, it is not possible to concatenate the output of several of these cards, as each one runs at a slightly different frequency. Whilst in practice, if several of these cards are feeding several computer monitors, the slight frequency difference may result in the positioning of the image in a slightly different position on each monitor, this positioning error would not be noticeable. However, when we are trying to simulate a complete display that is composed of the output of several video cards, then this would be highly objectionable.

Whilst it is possible to purchase specialist graphics cards which have a 'Genlock' facility whereby the graphics cards operate at a frequency fixed by an external source (i.e. the external signal replaces an internal clock for the graphics card), these cards are considerably more expensive than PC Graphics cards which do not have this functionality. It is therefore desirable to find another solution that is not as expensive as this Genlock option.

The present invention, at least in preferred embodiments, sets out to address at least some of the above-mentioned problems with current systems.

SUMMARY OF THE INVENTION

Viewed from a first aspect, the present application relates to a method of at least substantially synchronising data output from at least first and second graphics cards, the method comprising the steps of: (a) determining a synchronisation difference between the first graphics card and the second graphics card; (b) generating a correction signal based on said synchronisation difference; (c) supplying the correction signal to the second graphics card; and (d) adjusting the operating frequency of the second graphics card in response to said correction signal.

This method advantageously allows the use of industry standard computer graphics cards and allows their output to be synchronised. Thus, the output from the first and second graphics cards may, for example, be used for forming a composite image for display on a monitor. The synchronisation of the outputs from the first and second graphics card is particularly desirable for film and video images.

A video signal typically comprises a horizontal synchronisation signal (HSYNC) to signal the beginning of each new video line and a vertical synchronisation signal (VSYNC) to signal to a display to perform a vertical retrace and prepare to scan the next field. The method according to the present invention preferably comprises determining the synchronisation difference between a first vertical synchronisation signal from the first graphics card and a second vertical synchronisation signal from the second graphics card. Thus, the method preferably comprises determining a VSYNC synchronisation difference.

The operating frequency of the second graphics card is preferably increased in response to a positive synchronisation difference and is preferably decreased in response to a negative synchronisation difference. The operating frequency of the second graphics card may be increased and/or decreased by a predetermined amount in response to the correction signal. Preferably, however, the amount by which the operating frequency of the second graphics card is increased and/or decreased is related to the magnitude of the synchronisation difference. For example, the amount by which the operating frequency of the second graphics card is increased and/or decreased is preferably reduced when the magnitude of the synchronisation difference falls below a pre-determined level. Alternatively, the amount by which the operating frequency of the second graphics card is varied may be proportional to the magnitude of the synchronisation difference.

The at least first and second graphics cards are preferably provided in a first array of three or more graphics cards. The method preferably further comprises determining a synchronisation difference between the first graphics card and each additional graphics card in the first array and then adjusting the operating frequency of each additional graphics card in the first array with respect to the first graphics card. It will be appreciated that the operating frequency of each graphics card in the first array could be adjusted at least substantially to synchronise the data output from that graphics card with the data output from the previous graphics card in the array (rather than the first graphics card in each case), but this may lead to an unsatisfactory synchronisation difference between the first graphics card and the last graphics card in the first array.

The method preferably also comprises supplying data output from the first array to a second array. The second array preferably comprises one, two, three or more graphics cards. The method preferably further comprises: (e) determining a further synchronisation difference between the data output from the first array and at least one graphics card in the second array; (f) generating a further correction signal based on the further synchronisation difference; (g) supplying the further correction signal to the respective graphics card in the second array; (h) and adjusting the operating frequency of the respective graphics card in response to said further correction signal. These additional steps are preferably repeated for each graphics card in said second array.

The first graphics card may operate at a fixed frequency. Preferably, however, the first graphics card is provided with a voltage controlled oscillator and is set to operate at a nominal centre frequency.

Viewed from a further aspect, the present application relates to a method of at least substantially synchronising the output of a graphics cards with a reference signal the method comprising the steps of: (a) supplying said reference signal; (b) determining the synchronisation difference between said graphics cards and the reference signal; (c) generating a correction signal based on said synchronisation difference; (d) supplying the correction signal to the graphics card; and (e) adjusting the operating frequency of the graphics card in response to the respective correction signal.

The method preferably comprises determining the synchronisation difference between a vertical synchronisation signal from the graphics card and the reference signal.

By supplying a reference signal, the graphics card may at least substantially be synchronised with external systems, such as a "master signal" used in digital film and video facilities to facilitate the switching of sources of video or data synchronously.

The operating frequency of the graphics card is preferably increased in response to a positive synchronisation difference and is decreased in response to a negative synchronisation difference. The operating frequency of the graphics card is preferably increased and/or decreased by a predetermined amount in response to the correction signal. Alternatively, the amount by which the operating frequency of the graphics card is increased and/or decreased is related to the magnitude of the synchronisation difference between the referenced signal and the graphics card. For example, the amount by which the operating frequency of the graphics card is increased and/or decreased may be reduced when the magnitude of the synchronisation difference between the referenced signal and the graphics card falls below a predetermined level.

This method may be repeated for each of a plurality of graphics cards arranged in a first array at least substantially to synchronise data output from said graphics cards. The data output from the first array may be supplied to a second array. The second array may comprise one, two, three or more graphics cards. The method may further comprise: (e) determining a further synchronisation difference between the data output from the first array and at least one graphics card in the second array; (f) generating a further correction signal based on the further synchronisation difference; (g) supplying the further correction signal to the respective graphics card in the second array; (h) and adjusting the operating frequency of the respective graphics card in response to said further correction signal. This method is preferably repeated for each graphics card in the second array.

The reference signal is preferably supplied from an external source.

Viewed from a still further aspect, the present application relates to a method of at least substantially synchronising data output from a first array comprising at least one graphics card and a second array comprising at least one graphics cards, the method comprising the steps of: (a) supplying the data output of the first array to the second array; (b) determining a first synchronisation difference between a first graphics card in the second array and the data output from the first array; (c) generating a first correction signal based on said first synchronisation difference; (d) supplying the first correction signal to the first graphics card; and (e) adjusting the operating frequency of the first graphics card in response to the first correction signal.

The method preferably comprises determining the first synchronisation difference between a first vertical synchronisation signal from the first graphics card in the second array and a second vertical synchronisation signal from the data output from the first array.

This arrangement is particularly desirable as the output data from the graphics card(s) in the first array may be synchronised and used as a reference signal for the graphics card(s) in the second array. The method preferably further comprises determining a further synchronisation difference between the data output from the first array and each graphics array in the second array and then adjusting the operating frequency of each additional graphics card in the second array at least substantially to synchronise the data output.

The first array preferably comprises a plurality of graphics cards. The output data from the graphics cards in the first array is preferably at least substantially synchronised in accordance with the methods described herein.

The data from each of the graphics cards utilised in all of the methods described herein is preferably supplied to at least one buffer. The at least one buffer is preferably a first-in, first-out (FIFO) device. The supply of data to at least one buffer is preferably monitored and the output of data from the at least one buffer is preferably controlled to effect further synchronisation of the output data.

The methods of at least substantially synchronising data output from one or more graphics cards are preferably used to process an image or a plurality of images. The image(s) may come, for example, from a film or video image. The method preferably further comprises dividing the image or at least one of the images into a plurality of portions or strips and allocating each image portion or strip to a graphics card for processing. The data output of at least some of the graphics cards is preferably at least substantially synchronised in accordance with one of the methods described herein.

In arrangements where the method employs at least one buffer, the data supplied to the at least one buffer from each graphics card preferably comprises at least part of a line of the image to be processed or at least part of said at least one image to be processed. The start and/or end of each line of data may be monitored. The monitoring of the start and/or end of each line allows the timing of the output of data from the at least one buffer to be controlled (for example by delaying the output of data from a first graphics card; and outputting the data from a second graphics card early) to effect further synchronisation. The timing of the output of the data from the at least one buffer is preferably controlled with respect to a referenced signal, but it may alternatively be controlled with reference to the data output from one of the graphics cards.

The methods described herein may additionally include the step of modifying an existing graphics card by replacing a standard fixed frequency crystal oscillator with a variable voltage controlled oscillator.

Viewed from a yet further aspect, the present application relates to a system for processing images, the system comprising at least first and second graphics cards, means for determining a synchronisation difference between the first graphics card and the second graphics card, a correction signal generator for generating a correction signal based on the synchronisation difference, and an oscillator for varying the operating frequency of the second graphics card in response to a correction signal from the signal generator.

The means is preferably suitable for determining the synchronisation difference between a first vertical synchronisation signal from the first graphics card and a second vertical synchronisation signal from the second graphics card.

The second graphics card preferably comprises a voltage oscillator to facilitate adjustment of its operating frequency.

Viewed from a still further aspect, the present application relates to a system for processing images, the system comprising a plurality of graphics cards, a reference signal generator for generating a reference signal, means for determining a synchronisation difference between at least one of said graphics card and the reference signal, a correction signal generator for generating a correction signal based on the synchronisation difference determined for the at least one of said graphics card, and means for setting the operating frequency of the at least one of said graphics card in response to the correction signal generated for that graphics card.

The means is preferably suitable for determining the synchronisation difference between a first vertical synchronisation signal from the first graphics card and a second vertical synchronisation signal from the reference signal.

The correction signal is preferably generated by a digital low pass filter. The system preferably is provided with means for determining the difference between a target value set by the first graphics card and a measured value of the second graphics card. The means for determining said difference are preferably also suitable for supplying a value to the low pass filter. If the difference is positive, the means preferably supplies a first value (such as 4095) to the filter. Conversely, if the difference is negative, a second value (such as 0) is fed to the filter. The first and second values supplied to the filter may be varied depending upon the synchronisation difference determined over a period of time. For example, the amplitude of the first and second values may be reduced when the synchronisation difference falls within a predetermined range.

The graphics cards may each be provided with a voltage controlled oscillator.

The correction signal is preferably supplied to the voltage controlled oscillator via a digital-to-analogue converter.

Viewed from a yet still further aspect, the present application relates to a device for varying the operating frequency of a graphics card, the device comprising means for determining a synchronisation difference between the operating frequency of the graphics card and a reference signal or the operating frequency of another graphics card, a correction signal generator for generating a correction signal based on said synchronisation difference, and an oscillator for varying the operating frequency of the graphics card in response to the correction signal.

The means is preferably suitable for determining the synchronisation difference between a first vertical synchronisation signal from the first graphics card and a second vertical synchronisation signal from the reference signal or the second graphics card.

The device is preferably incorporated in a graphics card. It will be appreciated that the graphics card may be a standard item which is subsequently modified to incorporate the device.

Viewed from a yet further aspect, the present application relates to a method of at least substantially synchronising data output from at least first and second graphics cards, the method comprising the steps of:
(a) determining a VSYNC synchronisation difference between the first graphics card and the second graphics card;
(b) generating a correction signal based on said VSYNC synchronisation difference;
(c) supplying the correction signal to the second graphics card; and
(d) adjusting the operating frequency of the second graphics card in response to said correction signal.

Viewed from a further aspect, the present application relates to a method of processing an image employing a plurality of graphics cards, the method comprising the steps of: (a) dividing the image into a plurality of portions and allocating a portion of said image to each of said graphics cards for processing; (b) supplying data corresponding to a line of said image from each graphics card to a respective First-In, First-Out device; (c) monitoring the start or end position of the data from a first of said graphics card and determining an offset of the start or end position of the data from at least one of the other graphics card relative to the start or end position of the data from said first graphics cards; and (d) adjusting the output of data from the respective First-In, First-Out device in relation to the offset determined for the associated graphics card.

Viewed from a still further aspect, the present application relates to a method of at least substantially synchronising the output from a first graphics card with the output from a second graphics card;, the method comprising the steps of: (a) determining a synchronisation difference between the output of said first and second graphics cards; (b) generating a correction signal based on said synchronisation difference and adjusting the operating frequency of one of said graphics cards in response to said correction signal; (c) monitoring the synchronisation difference over a predetermined period of time; and (d) reducing the amplitude of the correction signal when the synchronisation difference falls within a predetermined range.

Viewed from a yet still further aspect, the present application relates to a method of processing data corresponding to an image, the method comprising the step of dividing the data into segments, each segment corresponding to a part of said image; wherein each segment of data is sized in relation to the amount of processing to be performed on the data corresponding to that part of the image.

The segments of data are preferably each processed by a dedicated processor, such as a graphics card. A vertex count may be performed to determine the amount of processing to be performed on data corresponding to a particular part of the image.

BRIEF DESCRIPTION OF THE DRAWINGS

Preferred embodiments of the present invention will now be described, by way of example only, and with reference to the accompanying drawings, in which.

DETAILED DESCRIPTION OF THE INVENTION

Figure 1:
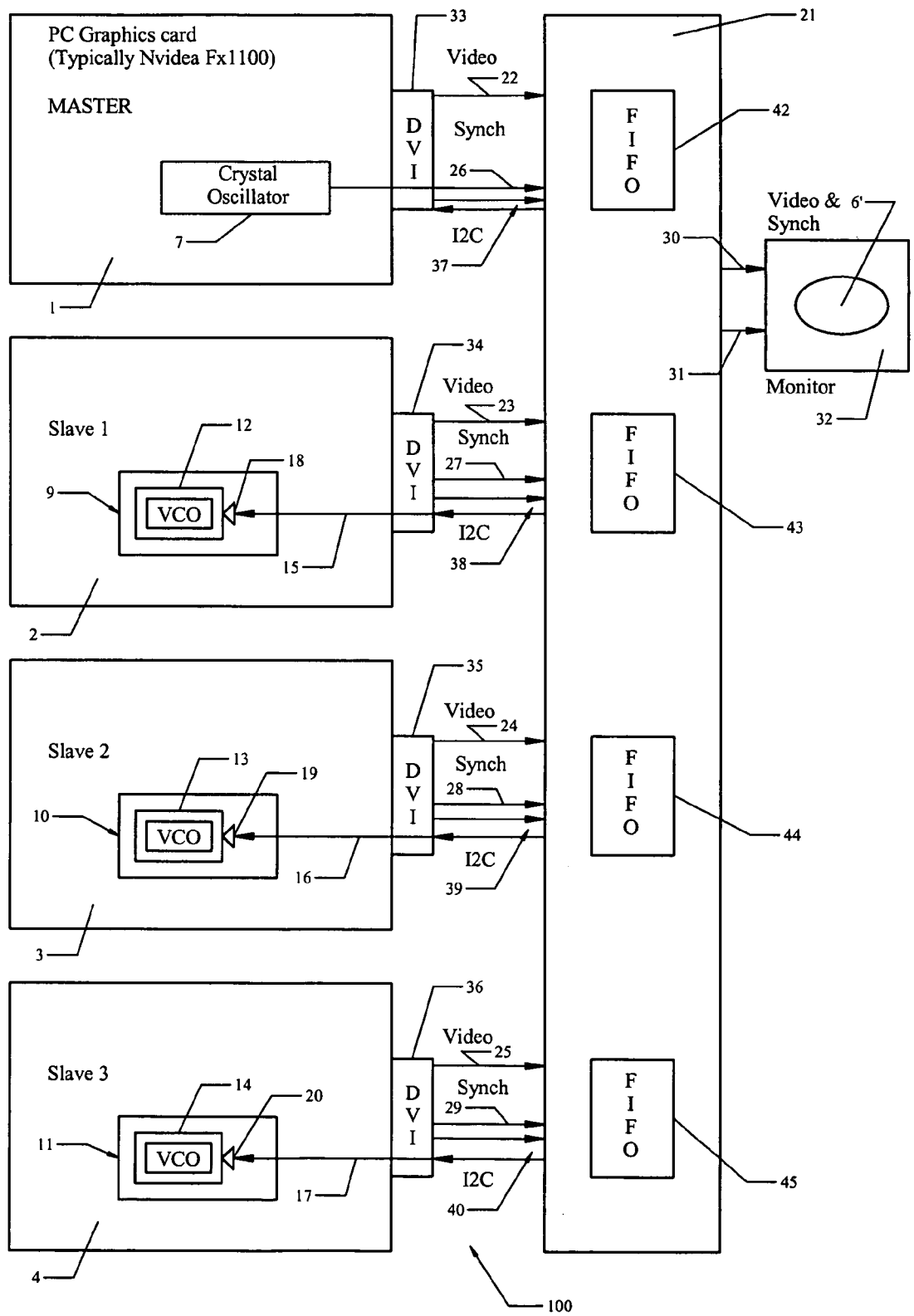
FIG. 1 shows a block diagram of a system in accordance with a first embodiment of the present invention.
Figure 2:
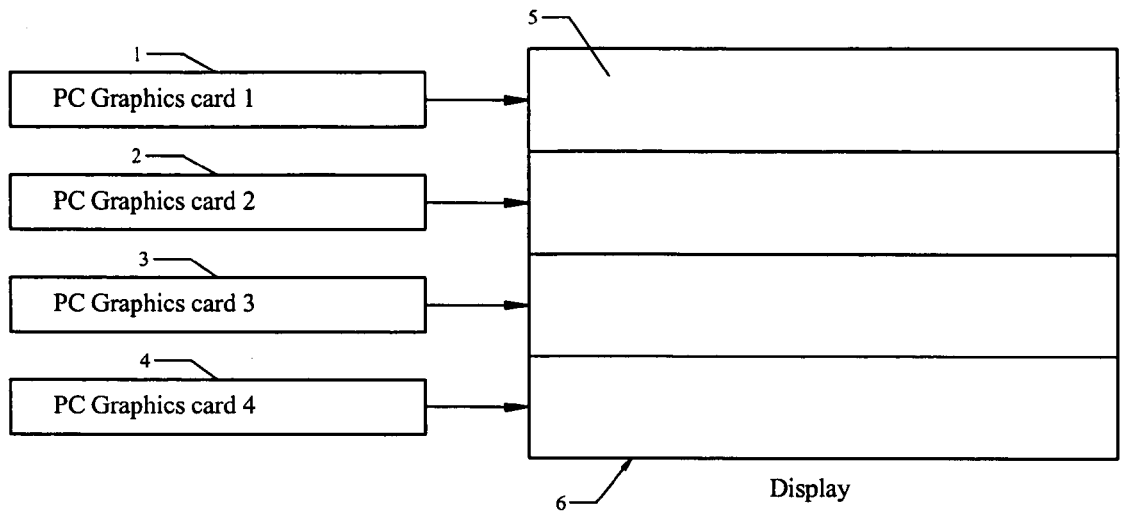
FIG. 2 shows schematically the division of an image to be processed by the system of the present invention.

A system 100 for processing a film or video image in accordance with the present invention is shown schematically in FIG. 1. The system has an architecture comprising first, second, third and fourth graphics cards (sometimes called video cards) 1, 2, 3, 4, each of which will process a slice or strip 5 of an image 6 to be processed, as shown in FIG. 2.

The first graphics cards 1 is a standard PC graphics card and has an internal crystal oscillator (not shown) which oscillates at a fixed frequency and sets the speed at which the graphics card operates. The second, third and fourth graphics cards 2, 3, 4 are based on standard PC graphics card but have been modified to operate in accordance with the present invention, as described in greater detail below. Graphics cards of the type supplied by Nvidia Corporation, of Santa Clara, Calif., USA. Specifically, the FX1100 model from Nvidia is suitable for use in the present invention, although almost any PC graphics card could be used.

The image 6 is a single frame of the film or video and the system 100 handles twenty-four of such frames per second. By dividing the image 6 into slices 5, the amount of data to be processed is lowered and each graphics card 1-4 can process the data given to it within ¹⁄₂₄th of a second, thus appearing to produce 'real time' processing.

It will be appreciated that the greater the processing capability of the graphics cards, the larger the slice 5 of the image 6 they can each handle. Thus, the number of graphics cards required to handle the image 6 may vary depending on the processing capability of each graphics cards. As PC technology improves, with faster processing speeds and bus speeds, the overall speed of the system 100 can also improve. Thus, the system 100 can effectively "ride" on developments in PC technology.

Although the division of the image 6 into slices 5 allows the image to be processed in the available timeframe, it is necessary subsequently to combine the slices to allow a processed image 6' to be viewed as if it were all one image. Thus, the outputs of each of the processors 3 must be combined to rebuild a composite image that represents the processed whole image 6'.

The difficulty in combining the slices 5 after they have been processed is that they may be out of synchronisation due to differences in the processing speed of each of the graphics cards 1-4. Even very small differences between the processing speeds of the graphics cards 1-4 would be obvious when the slices 5 are displayed next to each other after the processing has been completed. The output from the graphics cards 1-4 must be synchronised prior to being displayed to avoid any such problems.

In the embodiment shown in FIG. 1, the first graphics card 1 is designated as the "Master" card and the second, third and fourth graphics cards 2, 3, 4 are each slaved to this graphics card.

Figure 3:
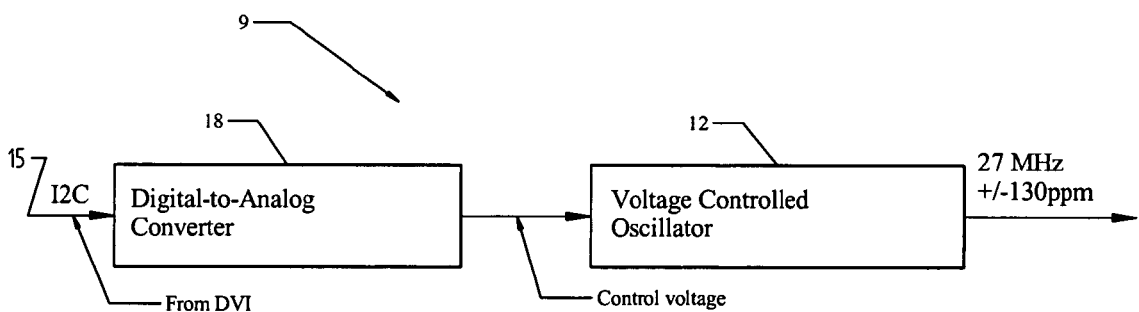
FIG. 3 shows a block diagram of frequency control circuit in accordance with the present invention.

The first graphics card 1 is a standard item with a crystal oscillator 7 which provides a fixed frequency which determines the operating speed of the first graphics card. A frequency control circuit 9, 10, 11 is fitted in a "piggyback" manner to each of the second, third and fourth graphics cards 2, 3, 4 to replace the standard crystal oscillator provided on the graphics cards. The frequency control circuits 9, 10, 11 each contain a 27 Mhz (+ or −100 parts per million) voltage controlled oscillator (VCO) 12, 13, 14 having a variable frequency output. The voltage controlled oscillators 12, 13, 14 are controlled by respective inputs 15, 16, 17 from an I2C bus which are passed through respective digital-to-analogue converters 18, 19, 20. A schematic drawing of the purpose built frequency control circuit 9 is shown in FIG. 3. The illustrated frequency control circuits 12, 13, 14 replace the simple crystal oscillator normally used by the graphics cards.

The system 100 further comprises a combiner 21, which receives a video output 22-25 and a synchronising output 26-29 from each of the graphics cards 1-4. The combiner 21 produces a combined video output 30 and a combined synchronising signal 31. The combined video output 30 and the combined synchronising signal 31 can be used to drive an industry standard monitor 32 to display the combined image stream.

Considering the interconnection between each of the graphics cards 1-4 and the combiner 21, the graphics cards are each provided with a DVI port 33-36. The DVI port is an industry standard interface on PC graphics cards and conforms to the DVI protocol which allows video information, synchronisation information, and a bi-directional I2C signal 37-40 to be transferred between the graphics cards 1-4 and the combiner 21. (I2C was developed by Philips™ Semiconductors, over 20 years ago and further information is available from <http://www.semiconductors.philips.com/buses/i2c/facts>. The specification for this bus can be obtained from Philips™ Semiconductors in the Netherlands, or from www.semiconductors.philips.com/acrobat/literature/9398/3934 0011.pdf.) The I2C signals 38, 39, 40 supplied to the second, third and fourth graphics cards 2, 3, 4 from the combiner 21 are passed through the respective digital-to-analogue converters 18, 19, 20 and the resulting signal is used to drive the respective voltage controlled oscillators 12, 13, 14.

The process of providing overall synchronisation of the data output from the graphics cards 1-4 will now be described.

The difference in synchronisation (i.e. overall frame period) between the first graphics card 1 (the "Master" graphics card) and the second graphics card 2 (the first "Slave" graphics card) is measured. The difference in the VSYNC of the first graphics card 1 and the VYSNC of the second graphics cards 1 can, for example, be determined to provide a VSYNC synchronisation difference.

This synchronisation difference is used to generate a correction signal 41. A digital low pass filter is used to generate the correction signal 41 by averaging the difference between the target value and the measured value. For example, assuming a 12 bit digital-to-analogue converter 18, if the synchronisation difference is positive, 4095 (full scale 12 bit value) is fed into the digital low pass filter; and, if the difference is negative, 0 is fed into the digital low pass filter. The output of the low pass filter is used as the value sent to the digital-to-analogue converter 11. This process provides a good closed loop lock around the desired point relatively quickly.

The correction signal 41 is then supplied, via the DVI port 25, from the combiner 21 to the second graphics card 2. The correction signal 41 generates a signal to be applied to the voltage controlled oscillator 12 in the second graphics card 2. This causes a slight change in frequency of the voltage controlled oscillator 12, which synchronises the second graphics card 2 to the first graphics card 1.

The above process is repeated for the third and fourth graphics cards 3, 4, so that the graphics cards 2, 3, 4 are each synchronised with the first graphics card 1.

The process is repeated every frame of the film.

The method described above provides a reasonable synchronisation between all of the graphics cards 1-4. However, drift may occur at a higher frequency than the frame rate. Therefore, the above method can be further improved by the optional addition of a line synchronisation loop. The line synchronisation loop can, for example, be used to synchronise the HSYNC of the graphics cards 1-4.

In the line synchronisation loop, the combiner 21 is provided with FIFO (First-In, First-Out) devices 42-45 for each graphics card 1-4. The FIFO devices 42-45 are typically of 128 pixel lengths. Each line of the processed image 6' is read through the respective FIFO 42-45 for each of the graphics cards 1-4.

The line start and line ends of the processed image 6' may be monitored relatively easily, as this is reflected in the synchronisation signals. By monitoring the line start (or end) position for each of the second, third and fourth graphics cards 2, 3, 4 with respect to the line start or end of the first graphics card 1, an 'offset' can be deduced within the respective FIFO devices 43, 44, 45 to delay (or start early) the reading out of the FIFO memory. This is done for every line, and is obviously repeated every frame.

As an example, if it is determined from monitoring the contents of the second, third and fourth FIFO devices 43, 44, 45, relative to the first FIFO device 42, that at the end of a given line:
i. The second graphics card 2 is seven pixels late.
ii. The third graphics card 3 is nine pixels late.
iii. The fourth graphics card is four pixels early (−4 pixels late).

The line data will be read from the second FIFO device 43 seven pixels early, relative to the data from the first FIFO device 42.

The line data will be read from the third FIFO device 44 nine pixels early, relative to the data from the first FIFO device 42.

The line data will be read from the fourth FIFO device 45 four pixels late, relative to the data from the first FIFO device 42.

In summary, the combination of the frame synchronisation and line synchronisation, at least in preferred embodiments, provides an excellent system to synchronise multiple outputs from individual PC Graphics cards 1-4, and allows a composite display to be provided, without the use of an intermediate frame store the size of the desired composite image being needed.

Although the first graphics card has been described in the first embodiment as a standard item with an internal crystal oscillator which oscillates at a fixed frequency, this may be undesirable as the crystal oscillator may have a poor tolerance on its frequency (potentially + or −150 parts per million). If the frequency of the first graphics card is changing by such an amount, the second, third and fourth graphics cards 2, 3, 4 may not be able to synchronise. Thus, the first graphics card 1 may advantageously also be provided with a frequency control circuit (not shown) having a voltage controlled oscillator. The voltage controlled oscillator has a centre frequency (27 MHz), a tolerance for that centre frequency (say + or −20 parts per million), and a "pullability" (say + or −100 per million) by which the frequency may be varied. By using the same control circuit on the first graphics card 1 as on the second, third and fourth graphics cards 2, 3, 4 and setting the frequency of the first graphics card 1 to its nominal centre frequency it is possible to ensure that the second, third and fourth graphics cards will achieve a lock.

Figure 4:
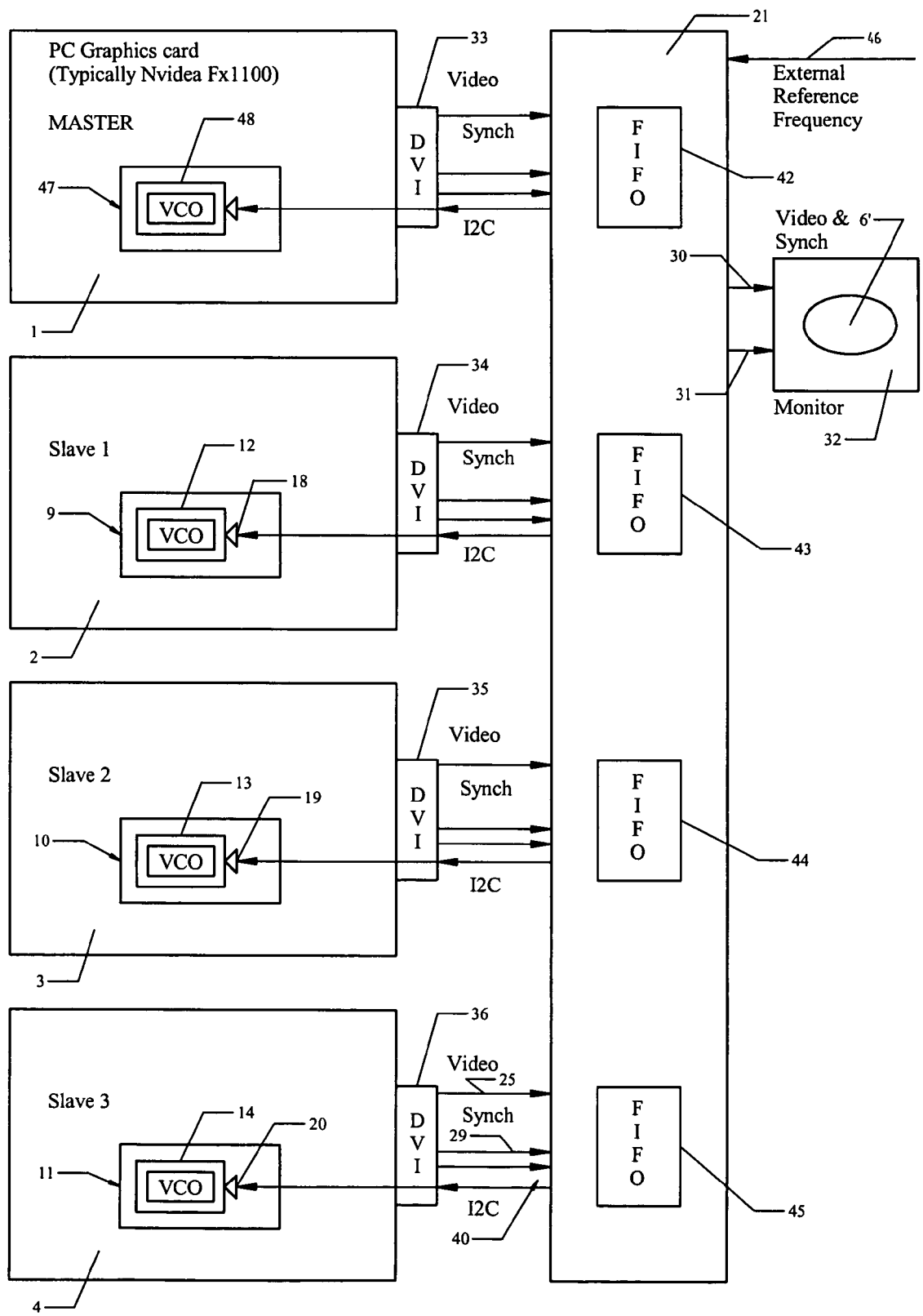
FIG. 4 shows a block diagram of a system in accordance with a second embodiment of the present invention.

In a second embodiment illustrated in FIG. 4, an externally generated reference signal 46 may be provided and each of the graphics cards 1-4 are synchronised to the reference signal. Like reference numerals have been used for like components in the description of this embodiment.

The first graphics card 1 in this embodiment is also provided with a frequency control circuit 47 having a voltage controlled oscillator 48. Furthermore, the externally generated signal 46 replaces the reference signal of the crystal oscillator 7 on the first graphics card 1 in the first embodiment. Thus, there is no "Master" graphics card, and the graphics cards 1-4 are each effectively slaved to the reference signal 46.

The operation of each of the graphics cards 1-4 is the same as that of the second, third and fourth graphics cards 2, 3, 4 described above in respect of the first embodiment. That is to say, the closed loop synchronisation process is repeated for each of the graphics cards 1-4.

Again, FIFO devices 42, 43, 44, 45 may optionally be provided for the respective graphics card 1-4. The reference signal should be used for synchronisation of the FIFO devices, although in practice this may not be necessary. For example, in the specific case of producing a broadcast video output, the system may have to be synchronised to a supplied synchronisation signal that can be decoded to provide information on the temporal location of each frame and each line. Therefore, the synchronisation signal could be fully decoded and provide an output that was finely synchronised to it. This may not be required in practice since downstream equipment may contain buffers to provide the fine synchronisation.

The external synchronisation may be the 'genlock' or 'master synch' commonly used in Digital Film and Video facilities to synchronise all of their equipment together. This enables the switching of sources of video or data synchronously.

Figure 5:
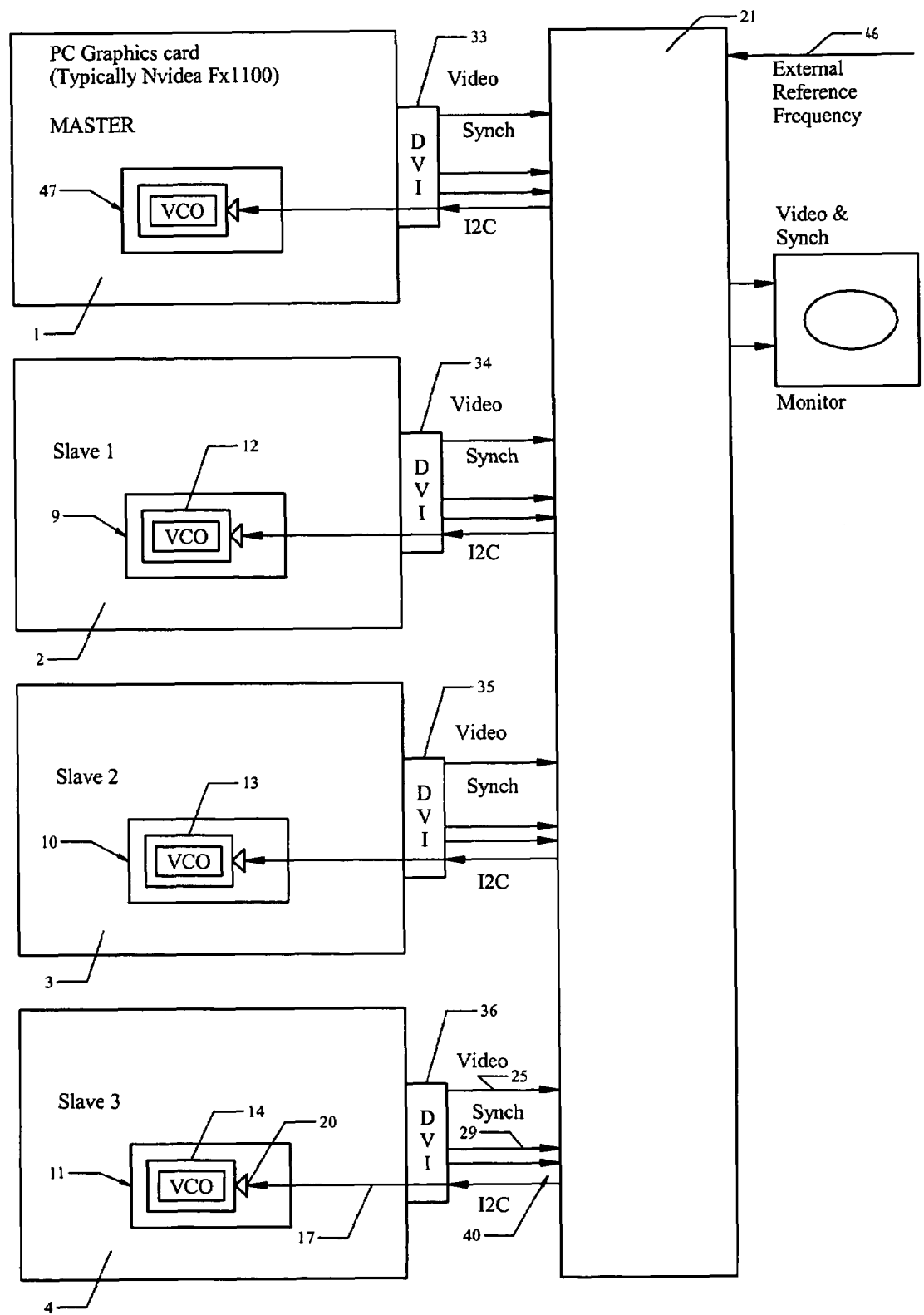
FIG. 5 shows a block diagram of a system in accordance with a third embodiment of the present invention.

A third embodiment of the present invention is illustrated in FIG. 5. This embodiment corresponds closely to the second embodiment described herein and like reference numerals have again been used for like components. However, the third embodiment further refines the correction signal 41 supplied to each voltage controlled oscillator 12, 13, 14, 48 by modifying the gain of the low pass filter as the ideal digital-to-analogue value is approached.

By modifying the gain of the low pass filter, the value fed into the low pass filter may be varied dynamically as the desired lock point is approached. The digital system can detect how well locked the video sources are by monitoring the difference over a number of frames. For example, if the system remains locked to within +/−100 pixels over several video frames then the process can be deemed to be well locked. Having determined that the process is well locked, the system changes the maximum and minimum values fed into the low pass filter from 4095 and 0 respectively to values based on the average digital-to-analogue value over the previous several frames (typically 8 frames). For example, if the average digital-to-analogue value over the last eight frames was 3172, the digital system would select 3172+512 (3684) as the maximum value fed into the filter, and 3172−512 (2660) as the minimum value fed into the low pass filter. If required, the maximum and minimum values can be further refined once the level of lock is deemed to have improved.

The above technique allows rapid rough synchronisation followed by further refinements, without the risk of large excursions away from the ideal digital-to-analogue value. This technique of successive refinement of the filter input allows for sub-pixel locking of the video sources over the time taken to complete a frame.

The modification of the gain of the low pass filter allows sufficiently accurate synchronisation that the system does not require FIFO devices 42-45 to effect further synchronisation. Of course, the FIFO devices 42-45 may be used in combination with the modification of the low pass filter's gain if it is found that further synchronisation is required.

It will be appreciated that the first and second embodiments described herein may be changed to include the step of modifying the gain of the low pass filter.

Figure 6:
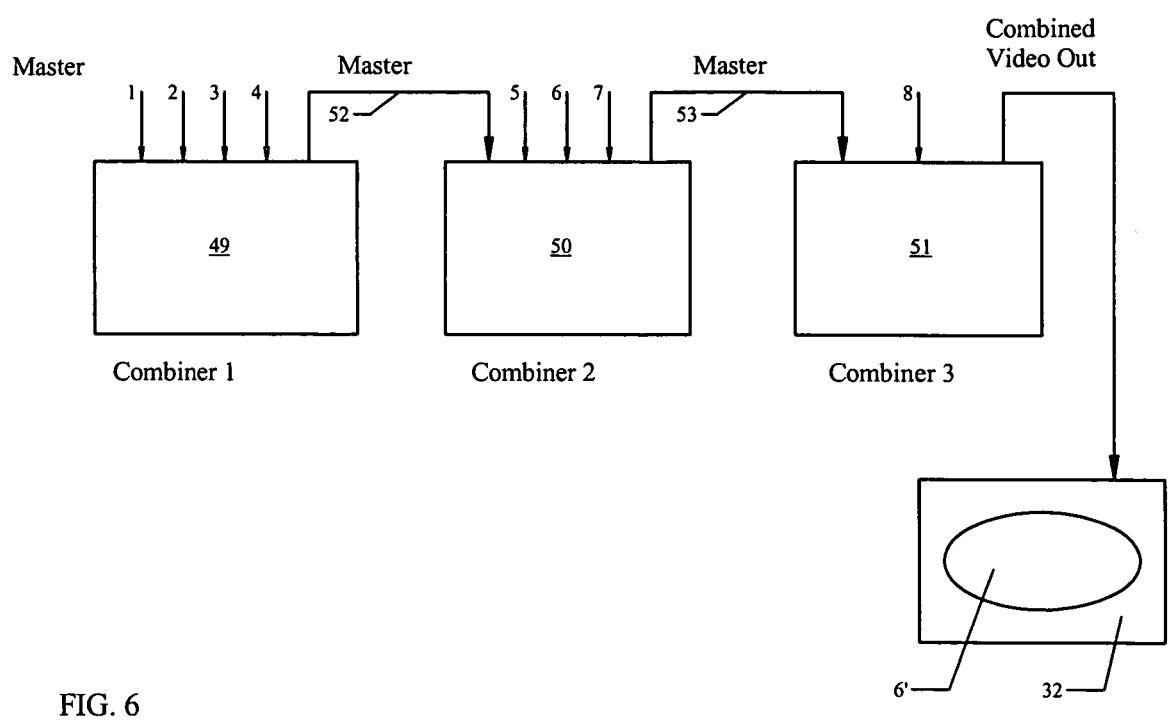
FIG. 6 shows a block diagram of a combination of three combiners in accordance with the present invention.

The synchronous and combiner architecture described herein is extensible. Whilst in the first and second embodiments the system 100 facilitates the combination of four sources into one video stream, the architecture could be easily extended to more than four sources. In fact, the present implementation can be cascaded using multiple combiners. An example of a cascaded system employing a first combiner 49, a second combiner 50 and a third combiner 51 is shown in FIG. 6.

The first combiner 49 combines first, second, third and fourth channels (typically supplied from first, second, third and fourth graphics cards 1-4). A first synchronisation signal 52 is taken from the first combiner 49, and used as the master channel of the second combiner 50. The second combiner 50 combines fifth, sixth and seventh channels (typically taken from fifth, sixth and seventh graphics cards) and synchronises them with the first synchronisation signal 52.

The second combiner 50 supplies a second synchronisation signal 53 to the third combiner 51. The second synchronisation signal 53 is used as the master input of the third combiner 51 which receives an eighth channel (typically from an eighth graphics card). The third combiner 51 synchronises the data received from the eighth channel with the second synchronisation signal 53 and outputs a processed image 6' derived from a combination of the data from each of the eight channels.

It will be appreciated that the cascaded system may include two, three, four or more combiners. Furthermore, each combiner may have one, two, three, four or more graphics cards 3.

The system described herein is suitable for use in the Speed FX system supplied by the applicant. The skilled person will, however, appreciate that the system could also be used in a video wall, where it is desirable to display images that are physically very large, where there are a number N of graphics cards, each processing a 'tile' of the composite image, and displayed on N separate monitors, where these monitors are physically abutted to simulate one large composite display.

The system 100 may also be employed to process images to create a 3-dimensional display. These displays typically generate different images to be viewed by a user's left and right eyes. The images are displayed consecutively and the user's eyes are covered so that each eye sees a different image. It is clearly important that the images displayed are carefully synchronised and the system 100 described herein, at least in preferred embodiments, is suited for such applications. Indeed, it is envisaged that the system 100, in a preferred embodiment, could be employed to provide images to create a 3-dimensional display on a video wall.

Moreover, it will be appreciated that the system 100 is not limited to luminous displays such as CRTs, LCD, or Plasma panels, as it is equally applicable to projected displays, where each individual projector is driven by an individual PC Graphics card.

The description has referenced a voltage control oscillator with a pullability of + or −100 parts per million. However, voltage controlled oscillators having a greater pullability may also be used. For example, using a voltage controlled oscillator with a pullability of + or −200 parts per million is feasible and may achieve synchronisation twice as quickly. Voltage controlled oscillators with pullability up to about + or −300 parts per million are also commonly available and could readily be used in accordance with the present invention.

Although the description herein describes how graphics cards are modified to provide a frequency control circuit in a piggyback mode, it will be appreciated that this functionality could be included in a graphics card to avoid the need for subsequent modification.

The systems and processes described herein have primarily considered applications whereby a single image is divided into portions. However, the systems and processes may be utilised for handling part or all of several different images. Thus, the processes described herein may write onto the overall composite monitor space two or more different images (rather than a single image). This extends the concept described herein to allow the display of a composite image from multiple graphics cards, without needing a frame buffer. The extensions consist of methods of using these same building blocks to display more complex image fields that meet the needs of post production, but by techniques that still do not necessitate a complex and expensive frame buffer.

The handling of data corresponding to the different images may involve the generation of an identifier code for identifying a region of the image to which a block of the data relates. The identifier is then stored to enable the block of data relating to a specified portion of the image to be identified. The blocks of data may subsequently be accessed to perform processing on some or all of the data contained therein to modify that part of the image. The identifier may be stored in a memory (for example in a graphics card) or by writing the identifier to a data storage device such as a hard disc.

In a further implementation of the Digital Film Post production system described herein, the application of computer processor (or graphics card) power can be varied by altering the amount of picture that is processed by each computer and graphics card sub-system. The system described above relied on four graphics cards, each processing one quarter of the overall image. However, in certain circumstances, it will be desirable to divide the image into segments depending on the required level of computational processing required, rather than in terms of picture elements to be processed.

Figure 7A:
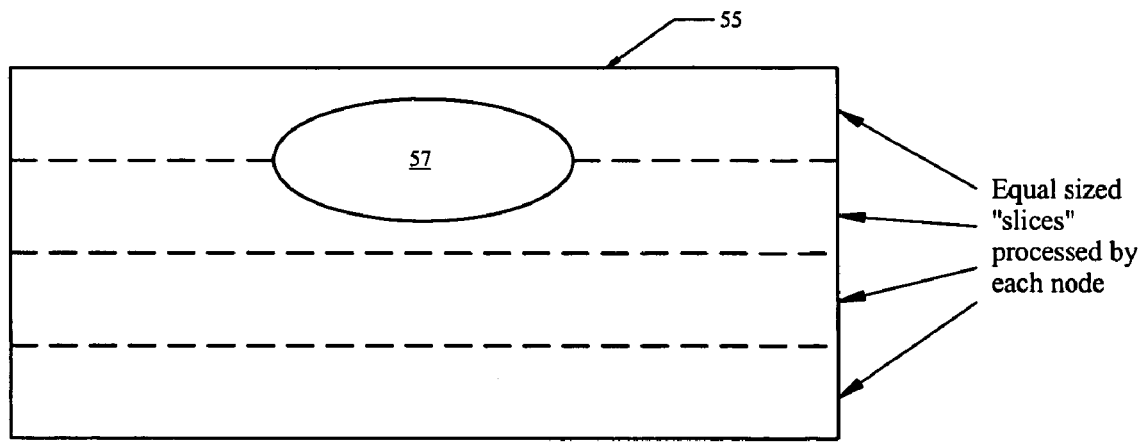
FIGS. 7a and 7b illustrate a modified arrangement of the present invention whereby the image is divided into portions of different sizes.
Figure 7B:
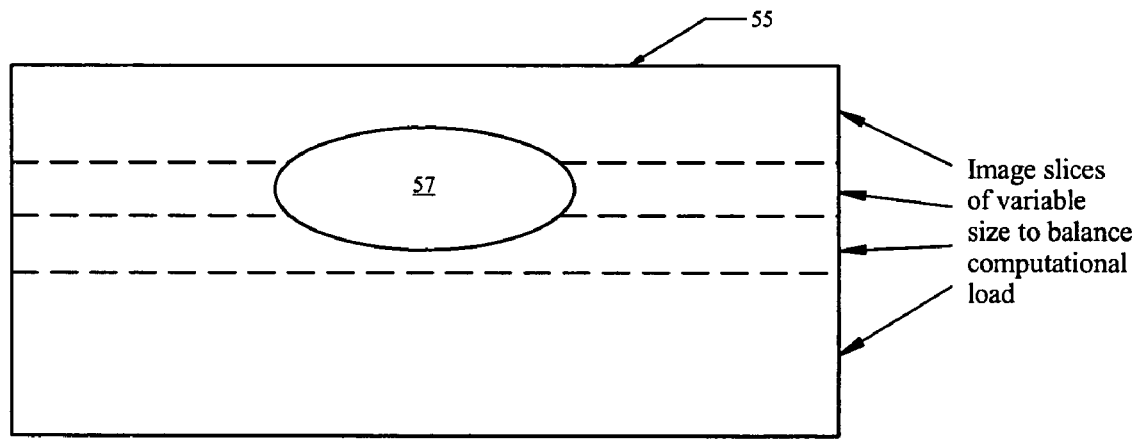
Figure 8A:
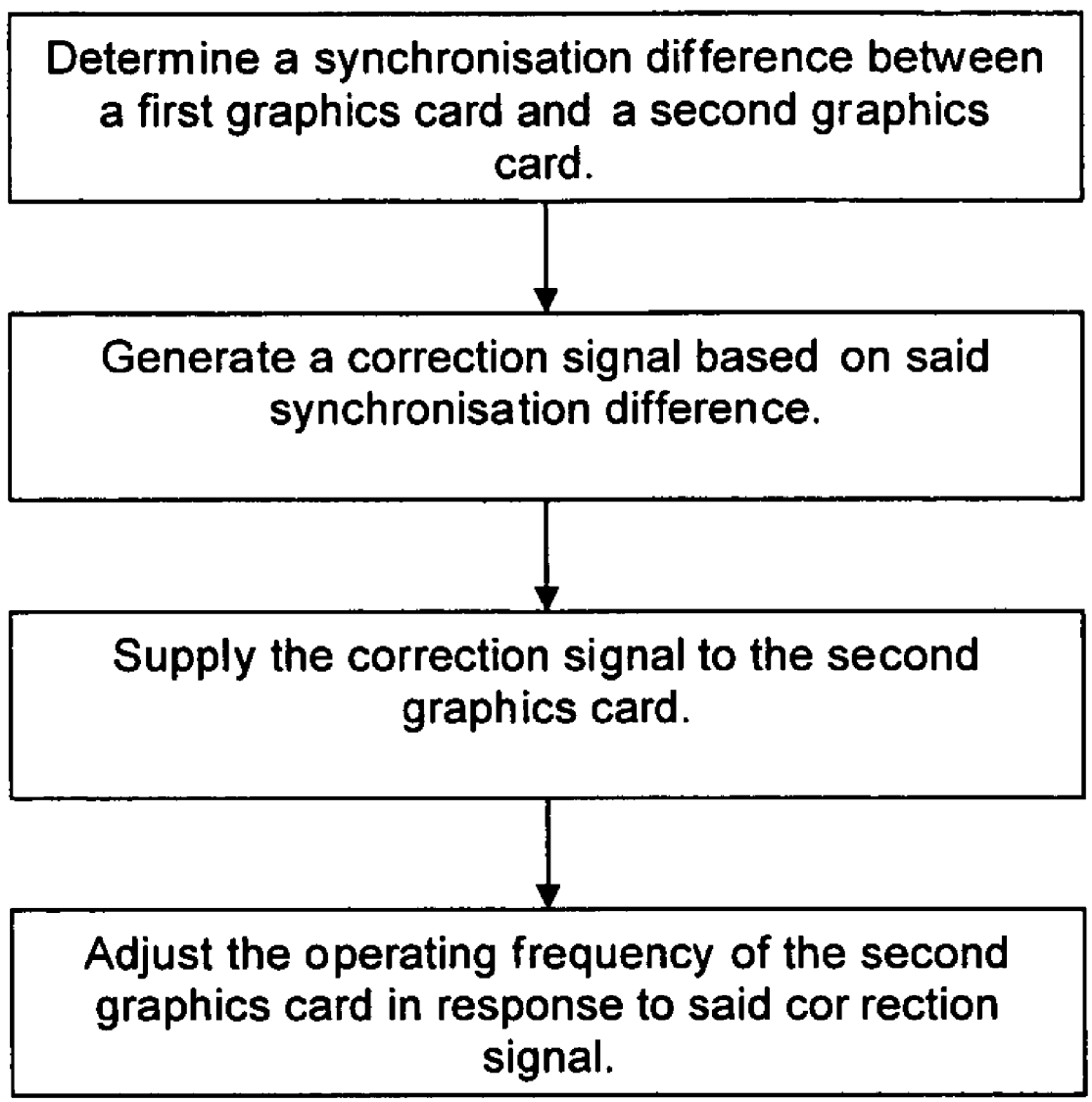
FIG. 8A illustrates the method according to the first embodiment.
Figure 8B:
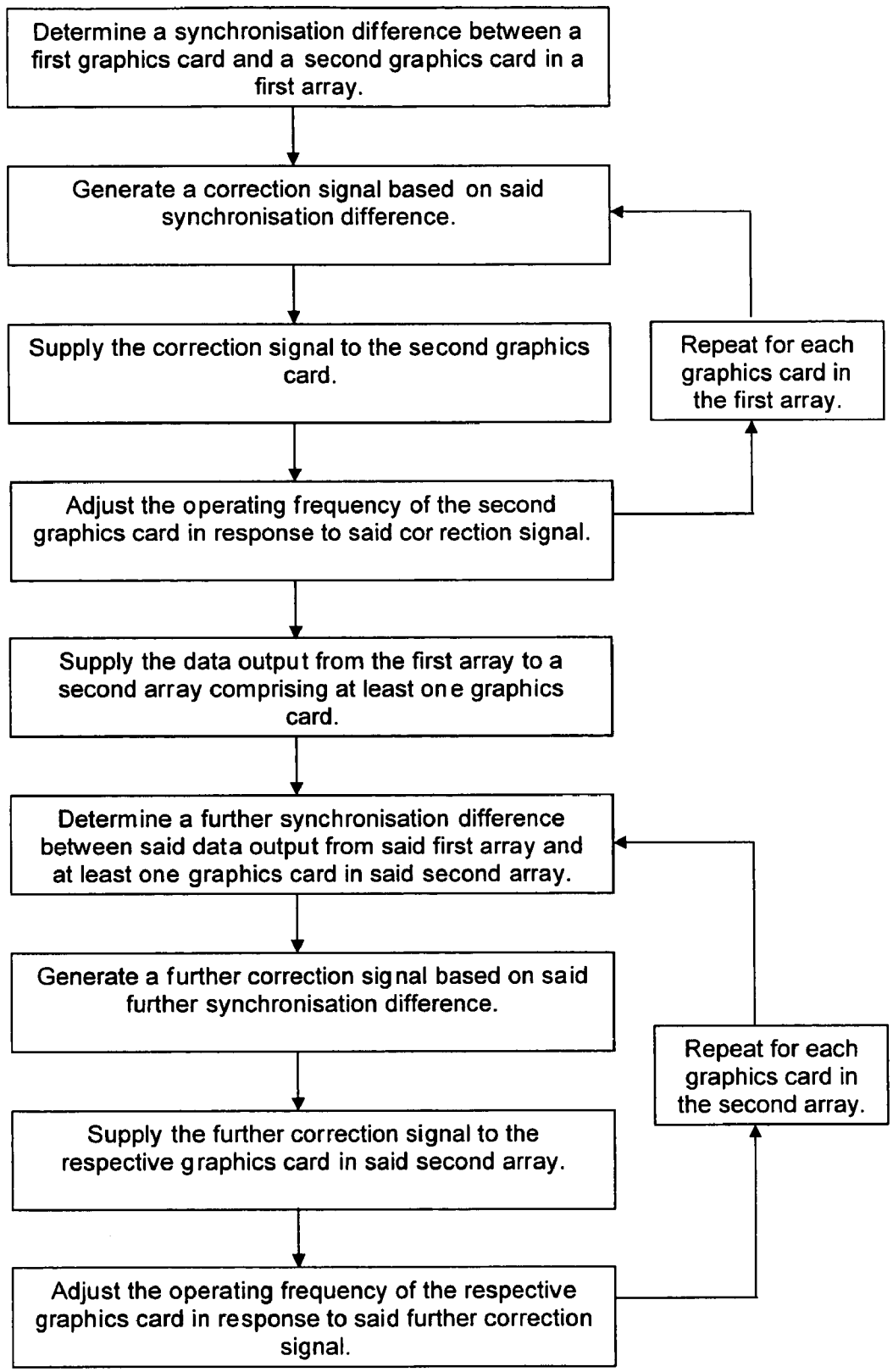
FIG. 8B illustrates the modified arrangement utilizing several arrays of graphics cards.
Figure 8C:
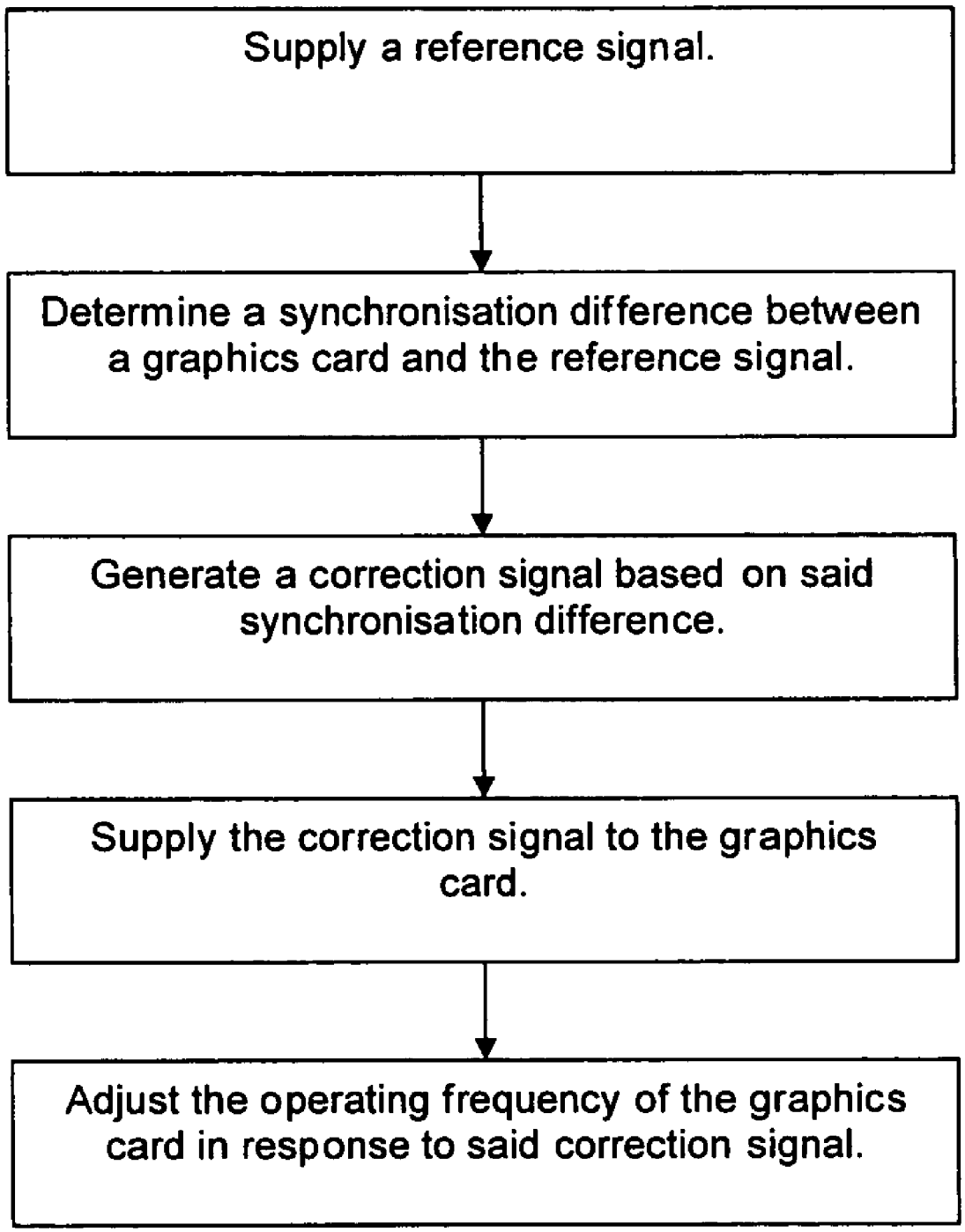
FIG. 8C illustrates the method according to the third and fourth embodiments of the present invention in which synchronization is performed in relation to a reference signal.
Figure 8D:
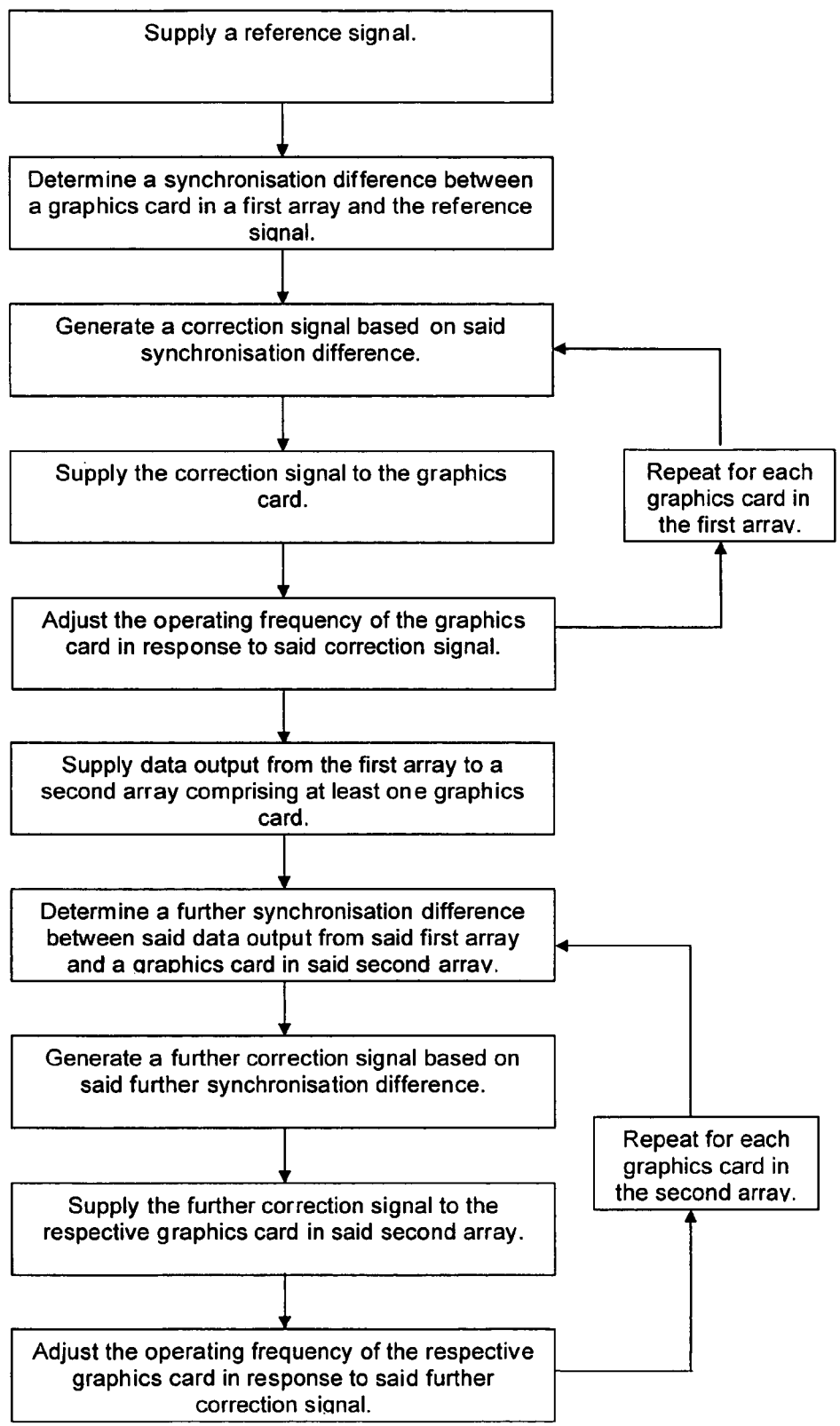
FIG. 8D illustrates the method utilizing a series of arrays of graphics cards synchronized with a reference signal.
Figure 8E:
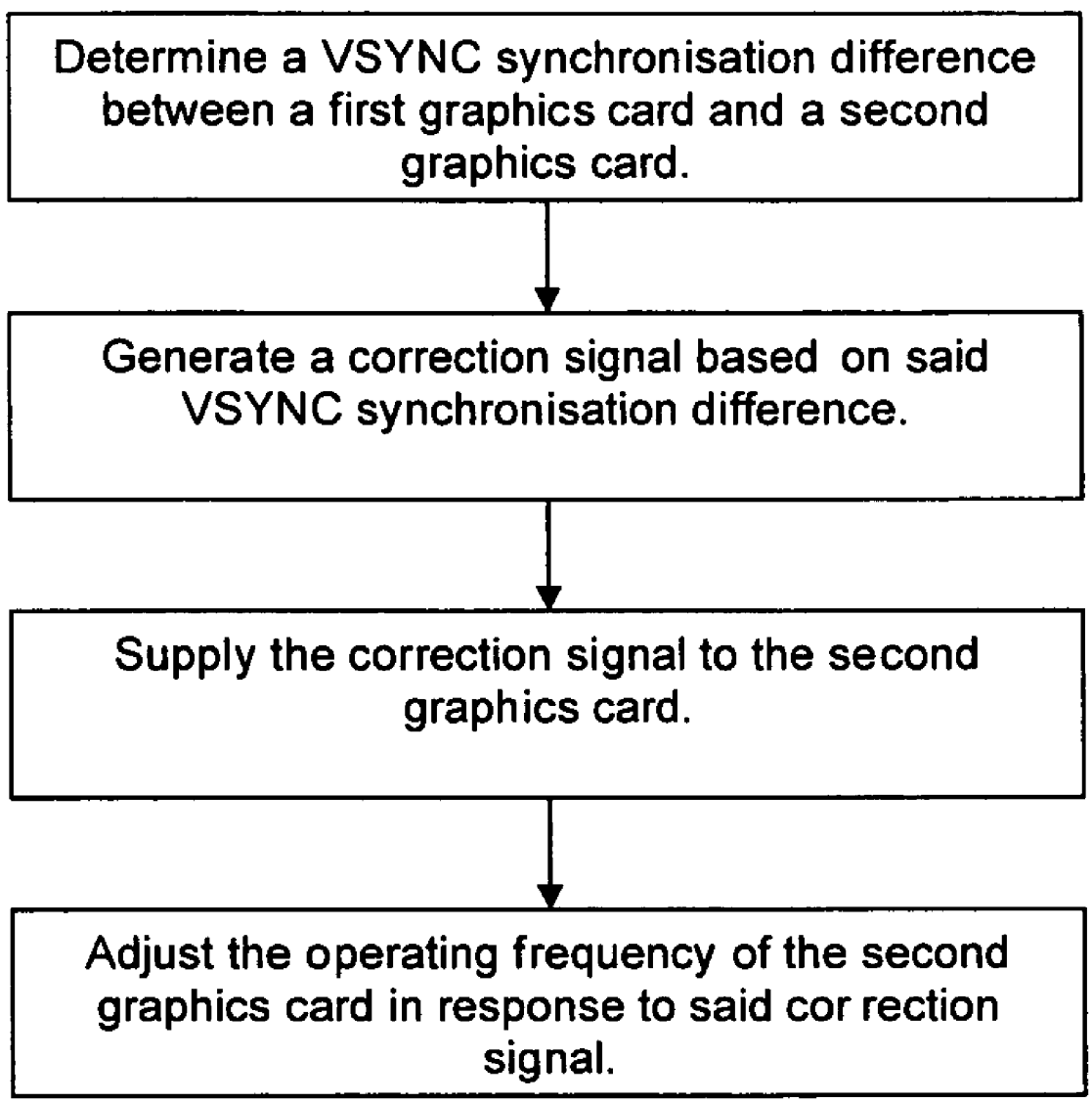
FIG. 8E illustrates the synchronizing method comprising determining a VSYNC synchronization difference.
Figure 8F:
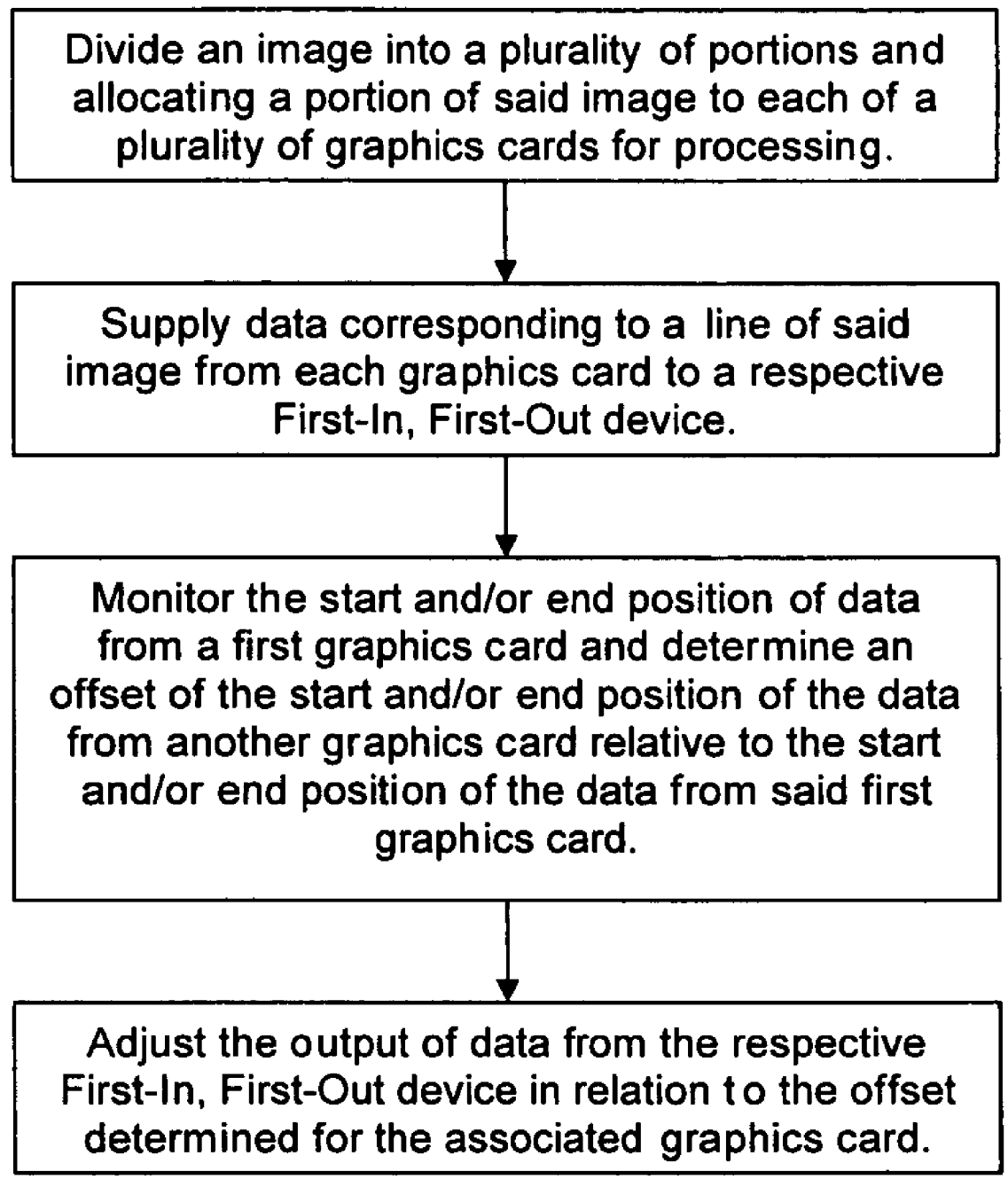
FIG. 8F illustrates the image processing method illustrated in FIGS. 7a and 7b.
Figure 8G:
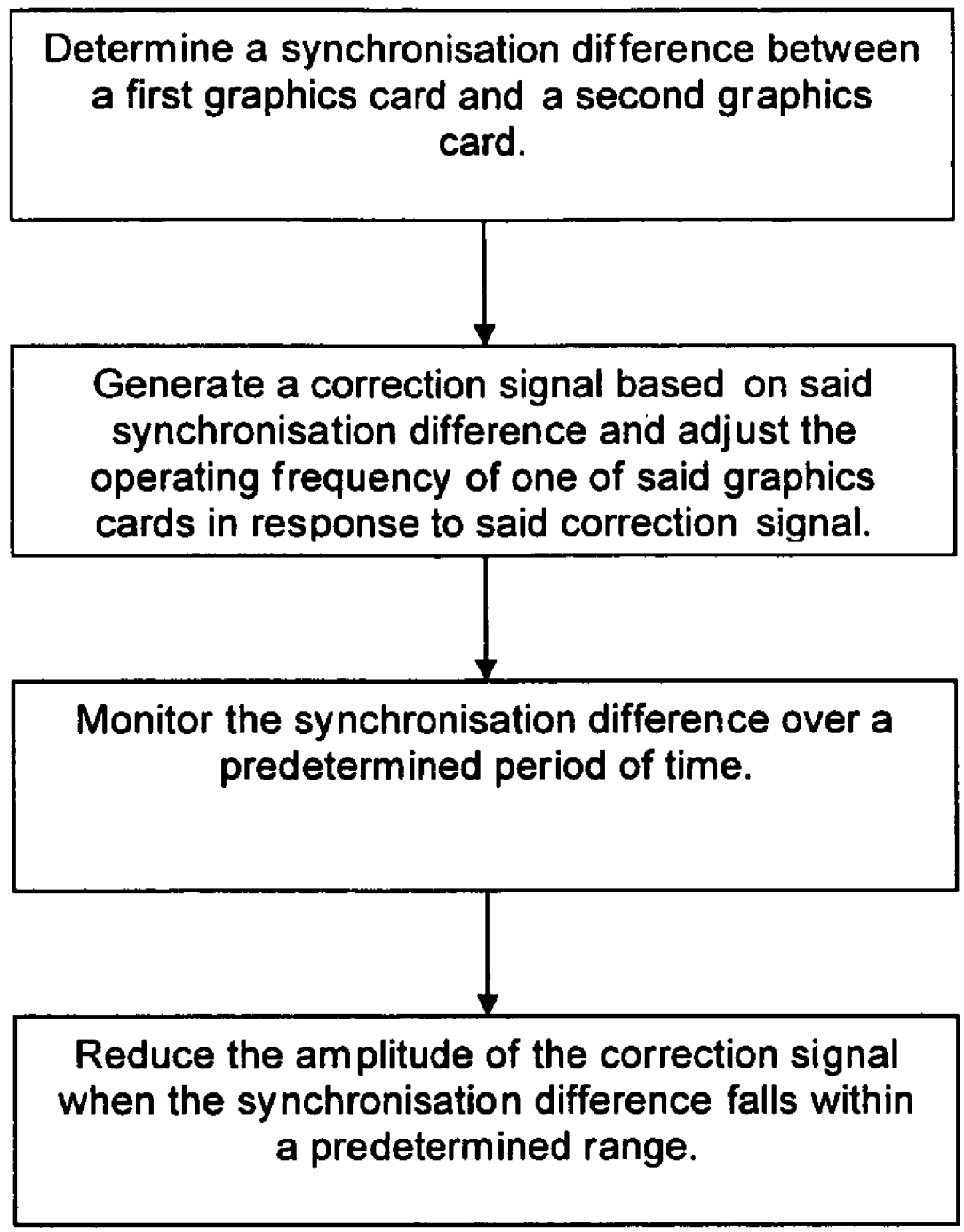
FIG. 8G illustrates the synchronizing method.

By way of example, consider an image 55 of the type shown in FIGS. 7a and 7b. It is desired to carry out particularly complex calculations on a small part 57 of the image, whilst the remainder of the image requires only a simple level of processing. The part 57 of the image may, for example, be a shiny object requiring additional computations to be performed. A metric is required to be able to allocate pixels per processor. One method is to carry out a vertex count (using, for example, vertex counting subroutines supplied by Macromedia Corporation or Alias.) and vary the size of each of the segments to be supplied to each of the processors depending on the level of processing required. Thus, the vertex count may be maintained approximately equal in each slice. This method can of course optimally be altered between frames, to ensure that each frame is correctly 'load balanced'. By the use of this feature, substantially greater productivity can be obtained with a given number of nodes, and functions that would not be possible to carry out in real time with an 'equal' split between nodes now become executable in real time.

What is claimed is:

1. A method of at least substantially synchronising data output from at least first and second graphics cards, the method comprising the steps of:
   (a) determining a synchronisation difference between the first graphics card and the second graphics card;
   (b) generating a correction signal based on said synchronisation difference;
   (c) supplying the correction signal to the second graphics card; and
   (d) adjusting the operating frequency of the second graphics card in response to said correction signal.

2. A method as claimed in claim 1, wherein the method comprises determining the synchronisation difference between a first vertical synchronisation signal from the first graphics card and a second vertical synchronisation signal from the second graphics card.

3. A method as claimed in claim 1, wherein the operating frequency of the second graphics card is increased in response to a positive synchronisation difference, and is decreased in response to a negative synchronisation difference.

4. A method as claimed in claim 1, wherein the operating frequency of the second graphics card is increased and/or decreased by a predetermined amount in response to said correction signal.

5. A method as claimed in claim 1, wherein the amount by which the operating frequency of the second graphics card is increased and/or decreased is related to the magnitude of the synchronisation difference.

6. A method as claimed in claim 5, wherein the amount by which the operating frequency of the second graphics card is increased and/or decreased is reduced when the magnitude of the synchronisation difference falls below a predetermined level.

7. A method as claimed in claim 1, wherein the at least first and second graphics cards are provided in a first array of three or more graphics cards.

8. A method as claimed in claim 7 further comprising determining a synchronisation difference between the first graphics card and each additional graphics card in said first array; and repeating steps (b), (c) and (d) for each additional graphics card in said first array.

9. A method as claimed in claim 7 further comprising supplying the data output from the first array to a second array comprising at least one graphics card.

10. A method as claimed in claim 9 further comprising:
    (e) determining a further synchronisation difference between said data output from said first array and at least one graphics card in said second array;
    (f) generating a further correction signal based on said further synchronisation difference;
    (g) supplying the further correction signal to the respective graphics card in said second array; and
    (h) adjusting the operating frequency of the respective graphics card in response to said further correction signal.

11. A method as claimed in claim 10 further comprising repeating steps (e), (f), (g) and (h) for each graphics card in said second array.

12. A method as claimed in claim 1, wherein said first graphics card operates at a fixed frequency.

13. A method as claimed in claim 1, wherein the data from each graphics card is supplied to at least one buffer.

14. A method as claimed in claim 13, wherein the supply of data to said at least one buffer is monitored.

15. A method as claimed in claim 14 further comprising controlling the output of data from said at least one buffer to effect further synchronisation of the output data.

16. A method of processing an image, the method comprising dividing the image into a plurality of portions and allocating each image portion to a graphics card for processing; wherein the data output of at least some of said graphics cards is at least substantially synchronised in accordance with the method of claim 1.

17. A method as claimed in claim 16, wherein the data from each graphics card is supplied to at least one buffer.

18. A method as claimed in claim 17, wherein the data supplied to said at least one buffer from each graphics card comprises at least part of a line of said image.

19. A method as claimed in claim 18 further comprising monitoring the start and/or end of each line of data.

20. A method as claimed in claim 16, wherein each portion is a strip of the complete image.

21. A method as claimed in claim 16, wherein the image is a frame of video or film.

22. A method of processing an image, the method comprising dividing the image into a plurality of portions and allocating each image portion to a graphics card for processing; wherein the data output of at least some of said graphics cards is at least substantially synchronised in accordance with the method of claim 1.

23. A method of processing a plurality of images, the method comprising dividing at least one of the images into a plurality of portions and allocating each image portion to a graphics card for processing; wherein the data output of at least some of said graphics cards is at least substantially synchronised in accordance with the method of claim 1.

24. A method as claimed in claim 23, wherein the data from each graphics card is supplied to at least one buffer.

25. A method as claimed in claim 24, wherein the data supplied to said at least one buffer from each graphics card comprises at least part of a line of said at least one image.

26. A method as claimed in claim 23 further comprising monitoring the start and/or end of each line of data.

27. A method as claimed in claim 23, wherein each portion is a strip of said at least one image.

28. A method as claimed in claim 1 including modifying an existing graphics card by replacing an existing oscillator with a voltage controlled oscillator.

29. A method of at least substantially synchronising the output of a graphics card with a reference signal, the method comprising the steps of:
    a) supplying said reference signal;
    b) determining the synchronisation difference between said graphics card and the reference signal;
    c) generating a correction signal based on said synchronisation difference;
    d) supplying the correction signal to the graphics card; and
    e) adjusting the operating frequency of the graphics card in response to the correction signal.

30. A method as claimed in claim 29, wherein the method comprises determining the synchronisation difference between a vertical synchronisation signal from the graphics card and the reference signal.

31. A method as claimed in claim 29, wherein the operating frequency of the graphics card is increased in response to a positive synchronisation difference, and is decreased in response to a negative synchronisation difference.

32. A method as claimed in claim 29, wherein the operating frequency of the graphics card is increased and/or decreased by a predetermined amount in response to the correction signal.

33. A method as claimed in claim 29, wherein the amount by which the operating frequency of the graphics card is increased and/or decreased is related to the magnitude of the synchronisation difference between the reference signal and the graphics card.

34. A method as claimed in claim 33, wherein the amount by which the operating frequency of the graphics card is increased and/or decreased is reduced when the magnitude of the synchronisation difference between the reference signal and the graphics card falls below a predetermined level.

35. A method as claimed in claim 29, wherein steps (a), (b), (c) and (d) are repeated for each of a plurality of graphics cards arranged in a first array at least substantially to synchronise data output from said graphics cards.

36. A method as claimed in claim 35 further comprising supplying the data output from the first array to a second array comprising at least one graphics card.

37. A method as claimed in claim 36 further comprising:
(e) determining a further synchronisation difference between said data output from said first array and a graphics card in said second array;
(f) generating a further correction signal based on said further synchronisation difference;
(g) supplying the further correction signal to the graphics card in said second array; and
(h) adjusting the operating frequency of the graphics card in the second array in response to said further correction signal.

38. A method as claimed in claim 37 further comprising repeating steps (e), (f), (g) and (h) for each graphics card in said second array.

39. A method as claimed in claim 29, wherein the reference signal is supplied from an external source.

40. A method as claimed in claim 29 including modifying an existing graphics card by replacing an existing oscillator with a voltage controlled oscillator.

41. A method of at least substantially synchronising data output from a first array comprising at least one graphics card and a second array comprising at least one graphics cards, the method comprising the steps of:
(a) supplying the data output of the first array to the second array;
(b) determining a first synchronisation difference between a first graphics card in the second array and the data output from the first array;
(c) generating a first correction signal based on said first synchronisation difference;
(d) supplying the first correction signal to the first graphics card; and
(e) adjusting the operating frequency of the first graphics card in response to the first correction signal.

42. A method as claimed in claim 41, wherein the method comprises determining the first synchronisation difference between a first vertical synchronisation signal from the first graphics card in the second array and a second vertical synchronisation signal from the data output from the first array.

43. A method as claimed in claim 41 further comprising determining a further synchronisation difference between the data output from the first array and each graphics card in the second array; and repeating steps (c), (d) and (e) for each additional graphics card in the second array.

44. A method as claimed in claim 41 wherein the first array comprises a plurality of graphics cards and the output data from the graphics cards in said first array is at least substantially synchronised in accordance with the method of any one of claims 6 or 33.

45. A system for processing images, the system comprising at least first and second graphics cards, means for determining a synchronisation difference between the first graphics card and the second graphics card, a correction signal generator for generating a correction signal based on the synchronisation difference, and an oscillator for varying the operating frequency of the second graphics card in response to the correction signal from the signal generator.

46. A system as claimed in claim 45, wherein the determining means is suitable for determining the synchronisation difference between a first vertical synchronisation signal from the first graphics card and a second vertical synchronisation signal from the second graphics card.

47. A system as claimed in claim 45, wherein the second graphics card comprises a voltage controlled oscillator for adjusting its operating frequency.

48. A system as claimed in claim 47, wherein the correction signal is supplied to the voltage controlled oscillator via a digital-to-analogue converter.

49. A system as claimed in claim 45, wherein the correction signal is generated by a digital low pass filter.

50. A system as claimed in claim 49 further comprising means for determining the difference between a target value set by the first graphics card and a measured value of the second graphics card and for supplying a valve to said low pass filter, wherein, in use, if the difference is positive a first value is fed into the filter and if the difference is negative a second value is fed into the filter.

51. A system for processing images, the system comprising a plurality of graphics cards, a reference signal generator for generating a reference signal, means for determining a synchronisation difference between at least one of said graphics cards and the reference signal, a correction signal generator for generating a correction signal based on the synchronisation difference determined for the at least one of said graphics cards, and means for setting the operating frequency of the at least one of said graphics cards in response to the correction signal generated for that graphics card.

52. A system as claimed in claim 51, wherein the means is suitable for determining the synchronisation difference between a first vertical synchronisation signal from the first graphics card and a second vertical synchronisation signal from the reference signal generator.

53. A system as claimed in claim 51, wherein each of said graphics cards comprises a voltage controlled oscillator.

54. A device for varying the operating frequency of a graphics card, the device comprising means for determining a synchronisation difference between the operating frequency of the graphics card and a reference signal or the operating frequency of another graphics card, a correction signal generator for generating a correction signal based on said synchronisation difference, and an oscillator for varying the operating frequency of the graphics card in response to the correction signal.

55. A device as claimed in claim 54, wherein said means is suitable for determining the synchronisation difference between a first vertical synchronisation signal from the graphics card and a second vertical synchronisation signal from the reference signal or the other graphics card.

56. A graphics card incorporating the device of claim 54.

57. A method of at least substantially synchronising data output from at least first and second graphics cards, the method comprising the steps of:
    (a) determining a VSYNC synchronisation difference between the first graphics card and the second graphics card;
    (b) generating a correction signal based on said VSYNC synchronisation difference;
    (c) supplying the correction signal to the second graphics card; and
    (d) adjusting the operating frequency of the second graphics card in response to said correction signal.

58. A method of processing an image employing a plurality of graphics cards, the method comprising the steps of:
    (a) dividing the image into a plurality of portions and allocating a portion of said image to each of said graphics cards for processing;
    (b) supplying data corresponding to a line of said image from each graphics card to a respective First-In, First-Out device;
    (c) monitoring the start and/or end position of the data from a first of said graphics card and determining an offset of the start and/or end position of the data from at least one of the other graphics card relative to the start and/or end position of the data from said first graphics card; and
    (d) adjusting the output of data from the respective First-In, First-Out device in relation to the offset determined for the associated graphics card.

59. A method of at least substantially synchronising the output from a first graphics card with the output from a second graphics card; the method comprising the steps of:
    (a) determining a synchronisation difference between the output of said first and second graphics cards;
    (b) generating a correction signal based on said synchronisation difference and adjusting the operating frequency of one of said graphics cards in response to said correction signal;
    (c) monitoring the synchronisation difference over a predetermined period of time; and
    (d) reducing the amplitude of the correction signal when the synchronisation difference falls within a predetermined range.

* * * * *